(12) United States Patent
Takahashi et al.

(10) Patent No.: US 7,629,034 B2
(45) Date of Patent: Dec. 8, 2009

(54) OPTICAL COMPENSATION FILM AND LIQUID CRYSTAL DISPLAY DEVICE

(75) Inventors: Yuta Takahashi, Minami-ashigara (JP); Michio Nagai, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 526 days.

(21) Appl. No.: 11/401,299

(22) Filed: Apr. 11, 2006

(65) Prior Publication Data

US 2006/0233970 A1    Oct. 19, 2006

(30) Foreign Application Priority Data

Apr. 12, 2005  (JP)  ............... 2005-115035

(51) Int. Cl.
*C09K 19/00* (2006.01)
*C09K 19/52* (2006.01)

(52) U.S. Cl. ............ 428/1.1; 430/20; 430/270.1; 252/299.01; 349/176; 349/75; 349/117

(58) Field of Classification Search ............ 430/20, 430/270.1; 428/1.1, 1.2; 252/299.01; 349/176, 349/75, 117

See application file for complete search history.

(56) References Cited

U.S. PATENT DOCUMENTS

| | | | |
|---|---|---|---|
| 5,583,679 A | 12/1996 | Ito et al. | |
| 6,805,924 B1 * | 10/2004 | Ishikawa et al. | 428/1.1 |
| 6,831,722 B2 * | 12/2004 | Ishikawa et al. | 349/117 |
| 2005/0285998 A1 * | 12/2005 | Saita et al. | 349/117 |
| 2006/0216435 A1 * | 9/2006 | Nakamura | 428/1.1 |

FOREIGN PATENT DOCUMENTS

| | | |
|---|---|---|
| JP | 2001-054144 A | 2/2001 |
| JP | 3335998 B2 | 2/2002 |
| WO | WO 99/42889 | 8/1999 |

* cited by examiner

*Primary Examiner*—Geraldina Visconti
(74) *Attorney, Agent, or Firm*—Buchanan Ingersoll & Rooney PC

(57) ABSTRACT

A novel optical compensation film is disclosed. The optical compensation film comprises a first optically anisotropic layer and a second optically anisotropic layer, each of which formed of a composition comprising a liquid-crystalline compound, wherein molecules of the liquid-crystalline compound in each of the first and second optically anisotropic layers are fixed in a hybrid alignment state in which tilt angles of the molecules with respect to a layer plane varies in a thickness direction.

16 Claims, 2 Drawing Sheets

OPTICAL COMPENSATION FILM AND LIQUID CRYSTAL DISPLAY DEVICE

This application claims benefit of priority under 35 USC. 119 to Japanese Patent Application No. 2005-115035 filed Apr. 12, 2005.

TECHNICAL FIELD

The present invention relates to liquid crystal display device capable of displaying three-dimensional images, and to an optical compensation film contributive to improvement in display characteristics of the liquid crystal display device capable of three-dimensional display.

RELATED ART

There is known a three-dimensional display device presenting three-dimensional stereo images to the viewer, in which a plurality of liquid crystal displays are disposed at different viewing distances from the viewer (Japanese Laid-Open Patent Publication "Tokkai" No. 2001-54144, or Japanese Patent No. 3335998).

The three-dimensional display device described in Japanese Patent No. 3335998 comprising a transmissive display closest to the viewer to display moving images such as running vehicle images, and a transmissive display furthest from the viewer to display a background image, and, therefore, can present deep images to the viewer.

DISCLOSURE OF THE INVENTION

In a case that a liquid crystal display is employed as the transmissive display in the three-dimensional display device described in the aforementioned Japanese Patent No. 3335998, the liquid crystal display is required to present images with a certain degree viewing angle to the viewer. However, generally, the viewing angle of a liquid-crystal display is small, and such the three-dimensional display device, comprising the liquid-crystal display, may provide only odd three-dimensional images due to its narrow viewing angle.

It is considered that the method described in Japanese Patent No. 3335998 wisely uses the addition law of polarized state. The viewer, however, usually watches images with the right eye at a viewing angle differed from at a viewing angle with the left eye, and, in view of satisfying the addition law of polarized state even in such a case, the liquid crystal display to be employed in the three-dimensional display, is required to keep retardation constant, and in a general sense to have a wide viewing-angle characteristic. This is important in particular in a black state or in a near-black state wherein images can largely be affected.

An object of the present invention is to provide a three-dimensional display device which comprises a plurality of liquid crystal display elements disposed at different depths from the viewer, improved in viewing angle dependence by employing an optical compensation film in the liquid crystal display element used therein, and capable of displaying more natural three-dimensional images by compensating retardation in particular in a black state, as compared with the case without using the optical compensation film. Another object of the present invention is to provide an optical compensation film contributive to improvement in three-dimensional display characteristics, in particular viewing-angle-dependent display characteristics of the three-dimensional display device.

In one aspect, the present invention provides an optical compensation film comprising:

a first optically anisotropic layer and a second optically anisotropic layer, each of which formed of a composition comprising a liquid-crystalline compound, wherein molecules of the liquid-crystalline compound in each of the first and second optically anisotropic layers are fixed in a hybrid alignment state in which tilt angles of the molecules with respect to a layer plane varies in a thickness direction.

As embodiments of the present invention, there are provided the optical compensation film, wherein, in the first optically anisotropic layer, the tilt angles of molecules in an area closer to the second optically anisotropic layer are larger than those in an area farther from the second optically anisotropic layer; and, in the second optically anisotropic layer, the tilt angles of molecules in an area farther from the first optically anisotropic layer are larger those in an area closer to the first optically anisotropic layer; the optical compensation film, wherein, in the first optically anisotropic layer, the tilt angles of molecules in an area closer to the second optically anisotropic layer are larger than those in an area farther from the second optically anisotropic layer; and, in the second optically anisotropic layer, the tilt angles of molecules in an area closer to the first optically anisotropic layer are larger those in an area farther from the first optically anisotropic layer; the optical compensation film, wherein, in the first optically anisotropic layer, the tilt angles of molecules in an area farther from the second optically anisotropic layer are larger than those in an area closer to the second optically anisotropic layer; and, in the second optically anisotropic layer, the tilt angles of molecules in an area closer to the first optically anisotropic layer are larger those in an area farther from the first optically anisotropic layer; and the optical compensation film, wherein, in the first optically anisotropic layer, the tilt angles of molecules in an area farther from the second optically anisotropic layer are larger than those in an area closer to the second optically anisotropic layer; and, in the second optically anisotropic layer, the tilt angles of molecules in an area farther from the first optically anisotropic layer are larger those in an area closer to the first optically anisotropic layer.

The liquid-crystalline compound may be selected from discotic liquid-crystalline compounds.

An in-plane slow axis of the first optically anisotropic layer measured in a normal direction to a layer plane may be substantially parallel or not parallel to an in-plane slow axis of the second optically anisotropic layer measured in a normal direction to a layer plane.

The optical compensation film may further comprise at least one support for supporting either or both of the first and second optically anisotropic layers. And the optical compensation film may further comprise, on the support, at least any one of an anti-glaring hard coat layer, a non-anti-glaring hard coat layer, a middle-refractive-index layer and a high-refractive-index layer, and a low-refractive-index layer.

In another aspect, the present invention provides a liquid crystal display device comprising in the order below, a light source, a polarizer film, a first liquid crystal cell comprising a pair of substrates, one of which having an electrode on one surface, and a liquid crystal layer held between said substrates, containing a liquid crystal material;

a first optical compensation layer comprising at least a single layer; and a second liquid crystal cell comprising a pair of substrates, one of which having an electrode on one surface, and a liquid crystal layer held between said substrates, containing a liquid crystal material.

As embodiments of the present invention, there are provided the liquid crystal display device, wherein a contrast ratio of the second liquid crystal cell is smaller than a contrast ratio of the first liquid crystal cell; the liquid crystal display device, wherein pixel pitch of the second liquid crystal cell is different from pixel pitch of the first liquid crystal cell; the liquid crystal display device, wherein the light source is capable of emitting light with an emission angle of 15° or larger; the liquid crystal display device, further comprising a second optical compensation layer composed of at least a single layer, being disposed between the first liquid crystal cell and the polarizer film, and/or outside the second liquid crystal cell, the first optical compensation layer and the second optical compensation layer being differed from each other at least either in in-plane retardation (Re) and in-thickness-direction retardation (Rth); and the liquid crystal display device, comprising an optical compensation film of the present invention as the first optical compensation layer.

In the specification, Re($\lambda$) and Rth($\lambda$) respectively mean an in-plane retardation and a retardation in a thickness-direction at wavelength $\lambda$. The Re($\lambda$) is measured by using KOBRA-21ADH (manufactured by Oji Scientific Instruments) for an incoming light of a wavelength $\lambda$nm in a vertical direction to a film-surface. The Rth($\lambda$) is calculated by using KOBRA-21ADH based on three retardation values; first one of which is the Re($\lambda$) obtained above, second one of which is a retardation which is measured for an incoming light of a wavelength $\lambda$nm in a direction rotated by +40° with respect to the normal direction of the film around an in-plane slow axis, which is decided by KOBRA 21ADH, as an a tilt axis (a rotation axis), and third one of which is a retardation which is measured for an incoming light of a wavelength $\lambda$nm in a direction rotated by −40° with respect to the normal direction of the film around an in-plane slow axis as an inclining axis (a rotation axis); a hypothetical mean refractive index and an entered thickness value of the film. The mean refractive indexes of various materials are described in published documents such as "POLYMER HANDBOOK" (JOHN WILEY & SONS, INC) and catalogs. If the values are unknown, the values may be measured with an abbe refractometer or the like. The mean refractive indexes of major optical films are exemplified below:

cellulose acylate (1.48), cyclo-olefin polymer (1.52), polycarbonate (1.59), polymethyl methacrylate (1.49), polystyrene (1.59).

When the hypothetical mean refractive index and a thickness value are put into KOBRA 21ADH, nx, ny and nz are calculated. And Nz, which is equal to (nx−nz)/(nx−ny), is calculated based on the calculated nx, ny and nz.

In the specification, the term of "slow axis" means a direction where the refractive index becomes a maximum value. A "visible light region" means a wavelength region of 380 to 780 nm. Also the refractive index is a value measured at $\lambda$=550 nm within the visible light region, unless specified otherwise. And in the specification, the terms of "polarizing film" is distinct from the term "polarizing plate", and the term of "polarizing plate" is used for any laminated body comprising a "polarizing film" and at least one protective film thereon.

Figure 1:
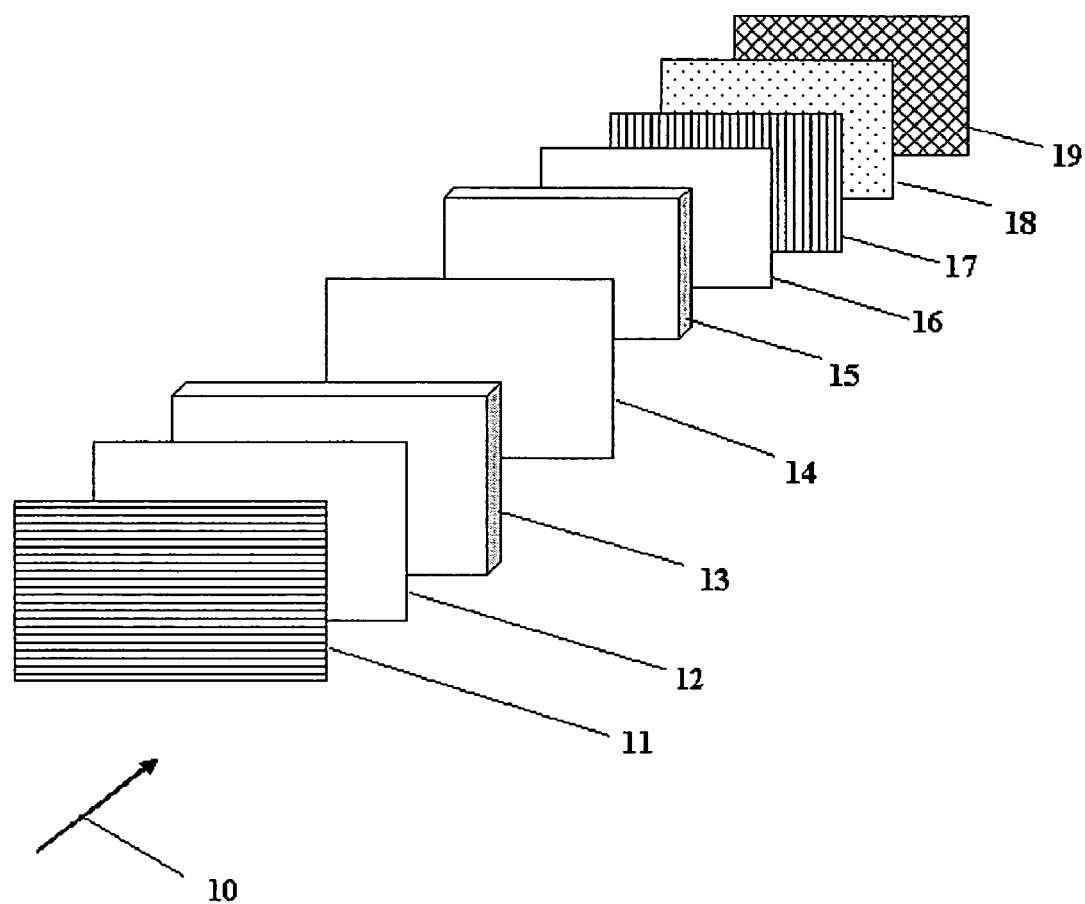
FIG. 1 is a schematic drawing showing an example of the liquid crystal display device of the present invention, capable of three-dimensional display.

Reference numerals used in the drawings express the followings:

11 viewer's-side polarizer film;
12 optically anisotropic layer;
13 viewer's-side liquid crystal cell (second liquid crystal cell);
14 optical compensation layer;
15 light-source-side liquid crystal cell (first liquid crystal cell);
16 optically anisotropic layer;
17 light-source-side polarizer film;
18 depolarizer plate;
19 light source;
20 first optically anisotropic layer;
21 support of a first optically anisotropic layer;
22 second optically anisotropic layer;
23 support of a second optically anisotropic layer;
24 liquid crystalline compound molecule; and
25 liquid crystalline compound molecule.

DETAILED DESCRIPTION OF THE INVENTION

In the following, the present invention will be explained with reference to the accompanying drawings. In the specification, ranges indicated with "to" mean ranges including the numerical values before and after "to" as the minimum and maximum values.

It is to be noted that, in all of the drawings, any constituents having the identical function are given with the same reference numerals, allowing omission of repetitive explanation.

[Liquid Crystal Display Device]

FIG. 1 is a schematic drawing showing an overall configuration of a three-dimensional display device as one embodiment of the present invention. The three-dimensional display device shown in FIG. 1 comprises a light source 19, two transmissive liquid crystal cells 13, 15, and an optical compensation layer 14 disposed between two transmissive liquid crystal cells. There is disposed a polarizer film 11 outside the liquid crystal cell 13 on the side closer to the viewer, and there is disposed a polarizer film 17 between the liquid crystal cell 15 and the light source 19 on the back side thereof, so that the absorption axes are perpendicular to each other. The polarizer film 11 disposed closer to the viewer 10 is, however, omissible for the case where the viewer 10 puts on polarized glasses. Also the light-source-side polarizer film 17 is omissible when the light source has a polarizing function.

Color images can be obtained by providing a color filter (not shown) inside the liquid crystal cells 13 and 15, or by employing a field sequential operation method in which color of the back light is varied in synchronization with two-dimensional images displayed on the liquid crystal cells 13 and 15.

The liquid crystal cells 13 and 15 may employ a twisted-nematic-type liquid crystal display mode, in-plane-type liquid crystal display mode, homogeneous-type liquid crystal display mode, ferroelectric liquid crystal display mode, guest-host-type liquid crystal display mode, polymer-dispersion-type liquid crystal display mode, holographic polymer-dispersion-type liquid crystal display mode, vertically aligned (VA) liquid crystal display mode, bend-mode liquid crystal display mode, OCB-mode liquid crystal display mode, and the combinations of these types or modes.

In this embodiment, allowing the viewer's-side liquid crystal cell (second liquid crystal cell) 13 to display movie images such as images of running vehicles for example, and allowing the light-source-side liquid crystal cell (first liquid crystal cell) 15 to display a background image make it possible to present a deep image to the viewer 10.

In one preferred embodiment, the contrast ratio of the viewer's-side liquid crystal cell 13, which displays the movie images, is set smaller than that of the light-source-side liquid crystal cell 15, which displays the background, and, therefore, such the embodiment can present images which give natural depth feel and a higher level of realism to the viewer.

In another preferred embodiment, a pixel pitch of the viewer's-side liquid crystal cell 13 is different from that of the light-source-side liquid crystal cell 15, thereby to correct the parallax of the viewer, and, therefore, such the embodiment can present images which give a higher level of realism to the viewer. In this embodiment, it is preferred that the pixel pitch of the viewer's-side liquid crystal cell 13 is larger than that of the light-source-side liquid crystal cell 15 because the display closer to the viewer may appear bigger.

The optical compensation layer 14 disposed between the liquid crystal cells 13 and 15 optically compensates the liquid crystal cells 13 and 15, so as to prevent three-dimensional stereo images from appearing odd even if viewed in oblique directions. The optical compensation layer 14 is a layer having at least function of generating retardation for the light transmitting therethrough, and is preferably designed so as to compensate the retardation of the liquid crystal cells 13 and 15 in a black state. For an exemplary case where the optical compensation layer 14 is composed of two layers, it is also allowable to design the layer placed more closer to the liquid crystal cell 13 as being contributive to optical compensation of the liquid crystal cell 13 in a black state, and the layer placed more closer to the liquid crystal cell 15 as being contributive to optical compensation of liquid crystal cell 15 in a black state. It is also allowable, as shown in FIG. 1, to dispose optically anisotropic layers 12 and 16 between the polarizer film 11 and the liquid crystal cell 13, and between the polarizer film 17 and the liquid crystal cell 15, respectively, so as to make it possible to compensate the retardation of the liquid crystal cells 13 and 15 in a black state, by means of these optically anisotropic layers and the optical compensation layer 14. In such embodiment, at least either one of the in-plane retardation (Re) and the in-thickness-direction retardation (Rth) of the optically anisotropic layer 12 or the optically anisotropic layer 16 preferably differ from each of those of the optical compensation layer 14. Of course, the optically anisotropic layers 12 and 16 are omissible, or may be integrated with the polarizer films 11 and 17, respectively. In such embodiment, protective films for the polarizer films 11 and 17 may function also as supports for the optically anisotropic layers 12 and 16.

The optical compensation layer 14 and the optically anisotropic layers 12 and 16 may be formed of a composition comprising a rod-like or discotic liquid crystalline compound, or of a polymer film. Materials and methods employed for preparing the optically anisotropic layer are same as those exemplified later for the optical compensation film of the present invention. For the case where the optical compensation layer and optically anisotropic layers are formed of polymer films, it is necessary to form them using a polymer exhibiting optical anisotropy. Examples of such polymer include polyolefins (e.g., polyethylene, polypropylene, norbornene-base polymer), polycarbonate, polyarylate, polysulfone, polyvinyl alcohol, polymethacrylate ester, polyacrylate ester and cellulose esters (e.g., cellulose triacetate, cellulose diacetate). It is also allowable to use copolymer or mixture of these polymers.

Optical anisotropy of the polymer film is preferably obtained by stretching. The stretching is preferably carried out in a uniaxial stretching manner or in a biaxial stretching manner. More specifically, longitudinal uniaxial stretching which is carried out by using the difference in peripheral speeds of two or more rolls, tenter stretching which is carried out by stretching a polymer film in the width while being held on both sides thereof, and biaxial stretching which is carried out based on a combination of them, are preferable. It is also allowable to combine two or more polymer films so as to exhibit the optical characteristics required for the optical compensation film or the optically anisotropic layer as a whole of the combination. The polymer film is also preferably prepared by a solvent-casting process in order to reduce non-uniformity in birefringence. The thickness of the polymer film is preferably 20 to 500 µm, and more preferably 40 to 100 µm.

The polymer film to be used as the optically anisotropic layer is also preferably formed by applying a solution, in which at least one polymer material selected from the group consisting of polyamide, polyimide, polyester, polyether ketone, polyamide-imide polyester imide, and polyaryl ether ketone, is dissolved into a solvent(s), to a surface, and drying the solution to remove the solvent. In this process, the polymer film may be formed on a surface of a base film, and it is also preferable to employ a technique of stretching the polymer film and the base film so as to generate optical anisotropy required as the optically anisotropic layer. A cellulose acylate film is preferably used as the base film. It is also preferable to prepare the polymer film on a surface of a temporary base, to peel the polymer film off from the temporary base, and to bond it to the cellulose acylate film to thereby use them in combination as the optically anisotropic layer. This technique can successfully thin the polymer film, wherein a thickness of 50 µm or smaller is preferable, and a thickness of 1 to 20 µm is more preferable.

There is no special limitation on materials for composing the optical compensation layer 14, so far as they can optically compensate the liquid crystal cells 13 and 15. In an embodiment in which the liquid crystal cells 13 and 15 employ a TN-mode, it is preferable to use the optical compensation film of the present invention described later as the optical compensation layer 14.

There is no special limitation on types of the light source 19, and various light sources are selectable from those generally used for three-dimensional image display. One preferred embodiment employing light sources capable of emitting light with an emission angle of 15° or more can present three-dimensional images which give a high level of realism due to an effect of parallax of both eyes of the viewer.

It is still also allowable, as shown in FIG. 1, to dispose a depolarizer plate 18 between the light source 19 and the polarizer film 17. The depolarizer plate 18 comprises an active domain and a non-active domain, wherein, the light coming into the active domain, the polarization of the light is eliminated and the depolarized light goes out, and the light coming into the non-active domain, the polarization of the light is not changed and the same polarized light goes out. The active domain and the non-active domain are arbitrarily selectable. With respect to this embodiment comprising the depolarizer plate, one exemplary case will now be discussed, assuming that an image of a round object is displayed on the liquid crystal cell 13, and an image of a square object on the liquid crystal cell 15. An area of the depolarizer plate 18 which corresponds to the area overlapping the images of the round object and the square object is then set in the active domains. Among the outgoing light from the liquid crystal cell 13, the outgoing light passing through the active region is a non-polarized light, and the outgoing light passing through the non-active region keeps the polarized state intact. And, therefore, in this embodiment, the square object is observed as being partially covered with the round object. As described in the above, this embodiment makes it possible to turn only the back image behind the front object image into the non-displayed state, so that it is made possible to prevent the front object image from being displayed with an unnatural transparency.

It is to be understood that the number of the liquid crystal cells in this embodiment is not limited to two, and it is also allowable to dispose one or more sets between the liquid crystal cells 13 and 15. Each set may comprise a combination of a liquid crystal display, which functions as a polarization variable element, comprising a liquid crystal cell and a polarizer plate, and a depolarizer plate, and it is allowable to dispose one or more of the sets between the liquid crystal cells 13 and 15.

The liquid crystal cell 13 and 15 preferably employ a TN-mode. The TN-mode liquid crystal cell has been most widely used as a color TFT liquid crystal display device, and extensively described in a number of literatures. For example, the TN-mode liquid crystal cell can be produced by injecting a liquid crystal material, having a positive dielectric anisotropy, a refractive index anisotropy $\Delta n$ of 0.0854 (589 nm, 20° C.) or around, and a dielectric anisotropy $\Delta \in$ of +8.5 or around, between the upper and lower substrates. Product $\Delta n \cdot d$ of the thickness d ($\mu$m) of the liquid crystal layer and the refractive index anisotropy $\Delta n$ is preferably adjusted to 0.2 to 1.2 $\mu$m, and more preferably to 0.2 to 0.5 $\mu$m. Alignment of the liquid crystal layer can be controlled based on surface property and axis of rubbing of the alignment layers formed on the inner sides of the upper and lower substrates. Director indicating the direction of orientation of the liquid-crystalline molecules, that is so-called tilt angle, is preferably adjusted to approximately 3°. The upper and lower substrates are rubbed in the directions which are perpendicular to each other, wherein the strength and the number of times of rubbing can control degree of the tilt angle. The alignment layer is preferably formed by applying polyimide composition to a surface to form a film, and by sintering the resultant film. The degree of twist angle of the liquid crystal layer is determined based on angle of crossing of the direction of rubbing between the upper and lower substrates, and a chiral agent added to the liquid crystal material. In order to adjust the twist angle to 90°, for example, it is preferable to add a chiral agent having a pitch of 60 $\mu$m or around. The thickness d of the liquid crystal layer may typically be adjusted to 5 $\mu$m or around. There is no special limitation on the liquid crystal material to be used, provided that it is nematic. A larger value of dielectric anisotropy $\Delta \in$ can further lower the operation voltage. A smaller value of refractive index anisotropy $\Delta n$ can further thicken the liquid crystal layer (gap), to thereby reduce variation in the gap width. On the other hand, a larger value of $\Delta n$ can further reduce the cell gap, and thereby allows the device to response more rapidly. The twist angle (tilt angle) of the liquid crystal layer from the light source side towards the display observation side is generally set so as to clock-wisely increase as viewed from the viewer, and reaches an optimum value at around 90° (85° to 95°). A bright and high-contrast display device can be obtained in this angular range, by virtue of a high white state luminance and a low black state luminance.

It is also allowable to dispose the viewer's-side polarizer film 11 and the light-source-side polarizer film 17 so that the absorption axes thereof are approximately perpendicular to each other; to dispose the viewer's-side polarizer film 11 and the liquid crystal cells 13 and 15 so that the absorption axis of the former is substantially parallel to the rubbing directions of the viewer's-side substrates of the latters; and to dispose the light-source-side polarizer film 17 and the liquid crystal cells 13 and 15 so that the absorption axis of the former is substantially parallel to the rubbing directions of the light-source-side substrates of the latters. It is also allowable to dispose the optically anisotropic layer 12 so that the rubbing direction of the optically anisotropic layer 12 is parallel to the absorption axis of the polarizer film 11, and in anti-parallel to the rubbing direction of the viewer's-side substrate of the liquid crystal cell 13. It is also allowable to dispose the optically anisotropic layer 16 so that the rubbing direction of the optically anisotropic layer 16 is substantially parallel to the absorption axis of the light-source-side polarizer film 17, and in anti-parallel to the rubbing direction of the light-source-side substrate of the liquid crystal cell 15. For the case where the polarizer films 11 and 17 have protective films thereon, and the protective films respectively disposed on the side closer to the liquid crystal cells 13 and 15 have in-plane slow axes, it is preferable to dispose the protective films so that the slow axes thereof are respectively crossed with the absorption axes of the polarizer films 11 and 17 at an angle, preferably at approximately 90°.

Pairs of substrates of the liquid crystal cells 13 and 15 may have transparent electrodes on the inner surfaces of the respective alignment layers, wherein liquid-crystalline molecules in the liquid crystal cell align in near parallel to a substrate plane in a non-operative state without applied voltage to the electrodes, so that light propagates through the liquid crystal cell along the twisted structure of the liquid-crystalline molecules, and goes out with its polarization plane rotated by 90°. In other words, the liquid crystal display device provides a white state under the non-operative state. In contrast to this, the liquid-crystalline molecules under the operative state align in a direction tilted by a certain angle away from the substrate plane, so that the light going through the polarizer film 11 propagates the liquid crystal cells 13 and 15 while keeping the polarization state thereof unchanged, and then blocked by the polarizer film 17. In other words, the liquid crystal display device provides a black state under the operative state. The liquid crystal display device comprising the optical compensation layer 14 and optically anisotropic layers 12 and 16 is therefore successful in providing an ideal black state, and makes it possible to prevent the three-dimensional stereo images from appearing odd even when observed in an oblique direction.

The above-described embodiment dealt with the case of transmission mode, showing an optimum value for $\Delta n d$ of the liquid crystal cell in the transmission mode, whereas the liquid crystal display device of the present invention may employ a reflection mode, wherein the optimum value for $\Delta n d$ is nearly halved because the optical path length in the reflection mode is doubled. Optimum value for the twist angle for a reflection mode falls in the range from 30° to 70°.

The liquid crystal display device of the present invention is not limited to the configuration shown in FIG. 1, and may include other components. For example, it is also allowable to dispose a color filter between the liquid crystal cell and the polarizer film. It is allowable to dispose a back light having a light source composed of cold cathode or hot cathode fluorescent tube, light emitting diode, field emission element, or electro-luminescence element. The liquid crystal display device of the present invention may be configured as a semi-transmissive one having a reflective portion and a transmissive portion within a single pixel of the display device, so as to balance the transmission mode and reflection mode.

The liquid crystal display device of the present invention includes those of direct image viewing type, image projection type and photo-modulation type. The present invention is particularly effective when applied to active-matrix-type liquid crystal display device using three-terminal or two-terminal semiconductor element such as TFT or MIM. Of course, an embodiment based on application to passive-matrix-type liquid crystal display device is also effective.

[Optical Compensation Film]

Paragraphs below will explain the optical compensation film of the present invention. The optical compensation film herein refers to an optical elements generally applied to liquid crystal display devices so as to compensate the retardation, and is synonymous with a retardation plate, an optical compensation sheet and so forth. The optical compensation film has birefringence, and is used for the purpose of eliminating coloring of display screen of the liquid crystal display device, or of improving the viewing-angle-dependent characteristics. The optical compensation film of the present invention is preferably employed in a liquid crystal display device capable of displaying three-dimensional stereo images, in particular in a liquid crystal display device displaying three-dimensional stereo images, comprising two liquid crystal cells. The optical compensation film of the present invention has a first optically anisotropic layer and a second optically anisotropic layer, each of which is formed of a composition comprising a liquid-crystalline compound, wherein molecules of the liquid-crystalline compound in each of the first and second optically anisotropic layers are fixed in a hybrid alignment state in which the tilt angles thereof with respect to a layer plane varies in the thickness direction. The optical compensation film of the present invention may comprise, besides the above-described first and second optically anisotropic layers, at least one support (polymer film, for example) holding them, and an alignment layer controlling orientation of the liquid crystalline molecules in the optically anisotropic.

The first and second optically anisotropic layers preferably have optical characteristics capable of optically compensating the retardation of the target liquid crystal cell in the black state. The optical characteristics, such as retardation, of the first and second optically anisotropic layers may be adjusted within desired ranges, based on the tilt angles, direction of orientation and so forth of the liquid crystalline molecules in the optically anisotropic layers.

FIGS. 2(a) to 2(d) are conceptual drawings showing several examples of embodiments of the optical compensation film of the present invention. It is to be understood that FIGS. 2(a) to 2(d) are merely conceptual drawings for simplifying the explanation, and do not always express an exact scale of molecular size and aligned state.

An optical compensation film shown in FIG. 2(a) comprises a first optically anisotropic layer 20, a support 21 supporting the same, a second optically anisotropic layer 22, and a support 23 supporting the same. Between each of the supports 21, 23 and each of the optically anisotropic layers 20, 22, there is respectively formed an alignment layer controlling orientation of the liquid crystalline compound molecules when the optically anisotropic layers are formed, although not illustrated in the drawing. In FIG. 2(a), in the first optically anisotropic layer 20, the tilt angles of molecules 24 in an area closer to the second optically anisotropic layer 22 are larger than those in an area farther from the second optically anisotropic layer 22. And, in the second optically anisotropic layer 22, the tilt angles of molecules 25 in an area farther from the first optically anisotropic layer 20 are larger those in an area closer to the first optically anisotropic layer 20. The optical compensation film shown in FIG. 2(a) may be produced by preparing two films (two supports 21, 23 in FIG. 2(a)), each of which having an optically anisotropic layer formed thereon by applying a composition containing a liquid crystalline compound to a surface of the film, aligning molecules of the liquid crystalline compound in a hybrid alignment state, fixing the molecules of the compound in that state, and then by bonding the two films having the optically anisotropic layer thereon so that the surface of one optically anisotropic layer faces the back surface of the other film.

In FIG. 2(b), in the first optically anisotropic layer 20, the tilt angles of molecules 24 in an area closer to the second optically anisotropic layer 22 are larger than those in an area farther from the second optically anisotropic layer 22. And, in the second optically anisotropic layer 22, the tilt angles of molecules 25 in an area closer to the first optically anisotropic layer 20 are larger those in an area farther from the first optically anisotropic layer 20. The optical compensation film shown in FIG. 2(b) may be produced by preparing two films (two supports 21, 23 in FIG. 2(b)), each of which having an optically anisotropic layer formed thereon by applying a composition containing a liquid crystalline compound to a surface of the film, aligning molecules of the liquid crystalline compound in a hybrid alignment state, fixing the molecules of the compound in that state, and then by bonding the two films having the optically anisotropic layer thereon so that the surface of one optically anisotropic layer faces the surface of the other optically anisotropic layer.

In FIG. 2(c), in the first optically anisotropic layer 20, the tilt angles of molecules 24 in an area farther from the second optically anisotropic layer 22 are larger than those in an area closer to the second optically anisotropic layer 22. And, in the second optically anisotropic layer 22, the tilt angles of molecules 25 in an area closer to the first optically anisotropic layer 20 are larger those in an area farther from the first optically anisotropic layer 20. The optical compensation film shown in FIG. 2(c) may be produced by preparing two films (two supports 21, 23 in FIG. 2(c)), each of which having an optically anisotropic layer formed thereon by applying a composition containing a liquid crystalline compound to a surface of the film, aligning molecules of the liquid crystalline compound in a hybrid alignment state, fixing the molecules of the compound in that state, and then by bonding the two films having the optically anisotropic layer thereon so that the surface of one optically anisotropic layer faces the back surface of the other film.

In FIG. 2(d), in the first optically anisotropic layer 20, the tilt angles of molecules 24 in an area farther from the second optically anisotropic layer 22 are larger than those in an area closer to the second optically anisotropic layer 22. And, in the second optically anisotropic layer 22, the tilt angles of molecules 25 in an area farther from the first optically anisotropic layer 20 are larger those in an area closer to the first optically anisotropic layer 20. The optical compensation film shown in FIG. 2(d) may be produced by preparing two films (two supports 21, 23 in FIG. 2(d)), each of which having an optically anisotropic layer formed thereon by applying a composition containing a liquid crystalline compound to a surface of the film, aligning molecules of the liquid crystalline compound in a hybrid alignment state, fixing the molecules of the compound in that state, and then by bonding the two films having the optically anisotropic layer thereon so that the back surface of one film faces the back surface of the other film. It is also allowable to use only a single support, and for example to form the first and the second optically anisotropic layers on the top surface and on the back surface, respectively, of the support such as a polymer film.

The optical compensation film of the present invention can have a desired optical characteristic by being adjusted in the relation between the in-plane slow axis of the first optically anisotropic layer measured in a normal direction to a layer plane and the in-plane slow axis of the second optically anisotropic layer measured in the normal direction to a layer plane. Both embodiments in which the in-plane slow axis of the first optically anisotropic layer measured in the normal direction is substantially parallel to the in-plane slow axis of the second optically anisotropic layer measured in the normal direction, and in which the in-plane slow axis of the first optically anisotropic layer measured in the normal direction crosses at an angle the in-plane slow axis of the second optically anisotropic layer measured in the normal direction, are allowable. The in-plane slow axes of the first and the second optically anisotropic layers preferably lie in parallel with each other, or lie at an angle of 0°, or preferably cross with each other at an angle of integral multiple of $\pi/2$, that is, 90°, 180° or 270°. The in-plane slow axis of the optically anisotropic layer can be controlled typically based on a rubbing direction of the alignment layer used when the optically anisotropic layer is formed.

[Optical Compensation Layer]

The first and second optically anisotropic layers are formed of a composition comprising a liquid-crystalline compound respectively. The liquid-crystalline compound is preferably selected from discotic or rod-like liquid-crystalline compounds, and more preferably selected from discotic liquid-crystalline compounds.

(Discotic Liquid-Crystalline Compound)

Examples of discotic liquid-crystalline compound, which can be used in the present invention, include benzene derivatives described in "Mol. Cryst.", vol. 71, page 111 (1981), C. Destrade et al; truxane derivatives described in "Mol. Cryst.", vol. 122, page 141 (1985), C. Destrade et al. and "Physics lett. A", vol. 78, page 82 (1990); cyclohexane derivatives described in "Angew. Chem.", vol. 96, page 70 (1984), B. Kohne et al.; and macrocycles based aza-crowns or phenyl acetylenes described in "J. Chem. Commun.", page 1794 (1985), M. Lehn et al. and "J. Am. Chem. Soc.", vol. 116, page 2,655 (1994), J. Zhang et al.

Examples of the discotic compound also include those having straight-chain alkyl groups, alkoxy groups or substituted benzoyloxy groups substituted on a molecular center core, as side chains extending radially therefrom. It is preferred that a discotic molecule or an aggregate thereof shows a rotation symmetry and is capable of aligning in a preferred alignment state. Preferable examples of the discotic compounds are also described in Japanese Laid-Open Patent Publication "Tokkaihei" No. 8-50206.

In the optically anisotropic layer, the discotic liquid crystalline molecules are preferably fixed in an aligned state, and are most preferably fixed by a polymerization reaction. Polymerization of the discotic liquid crystalline molecules is described in Japanese Laid-Open Patent Publication "Tokkaihei" No. 8-27284. In order to fix the discotic liquid crystalline molecules by polymerization, it is necessary to bind a polymerizable group as a substituent group to a discotic core of the discotic liquid crystalline molecule. Bonding of the polymerizable group directly to the discotic core may, however, make it difficult to keep the aligned state, so that a coupling group is introduced between the discotic core and the polymerizable group. Discotic liquid crystalline molecules having polymerizable groups are disclosed in Japanese Laid-Open Patent Publication "Tokkai" No. 2001-4387.

(Rod-Like Liquid Crystalline Compounds)

Examples of the rod-like liquid crystalline compound applicable to the present invention include azomethines, azoxys, cyanobiphenyls, cyanophenyl esters, benzoate esters, cyclohexane carboxylic acid phenyl esters, cyanophenyl cyclohexanes, cyano-substituted phenyl pyrimidines, alkoxy-substituted phenyl pyrimidines, phenyl dioxanes, tolans and alkenyl cyclohexyl benzonitriles. Not only the low-molecular-weight liquid crystalline compounds as described in the above, it is also allowable to use polymer liquid crystalline compounds.

In the optically anisotropic layer, the rod-like liquid crystalline molecules are preferably fixed in an alignment state, and are most preferably fixed by a polymerization reaction. Examples of the polymerizable rod-like liquid crystalline compound applicable to the present invention include those described in Makromol. Chem., vol. 190, p. 2255 (1989), Advanced Materials, vol. 5, p. 107 (1993), U.S. Pat. Nos. 4,683,327, 5,622,648 and 5,770,107, International Patent Publication Nos. WO95/22586, 95/24455, 97/00600, 98/23580 and 98/52905, Japanese Laid-Open Patent Publication "Tokkaihei" Nos. 1-272551, 6-16616, 7-110469, 11-80081 and Japanese Laid-Open Patent Publication "Tokkai" No. 2001-328973.

Paragraphs below will detail preferred embodiments of the optically anisotropic layer in which discotic molecules are fixed in a hybrid aligned state with a tilt angle with respect to a layer plane varying in the thickness direction.

The first and second optically anisotropic layers are preferably designed so as to compensate the retardation generated in the liquid crystal cell of the liquid crystal display device in a black state. The aligned state of the liquid-crystalline compound in the liquid crystal cell in a black state varies depending on modes of the liquid crystal display device. Relations between the aligned state of the liquid-crystalline compound in the liquid crystal cell and alignment of the compensation film are described in IDW'00, FMC7-2, P411 to 414.

The discotic molecules in the above-described first and second optically anisotropic layers are fixed in the hybrid alignment, so that the average of the tilt angles of the long axes (long diameter of the disk plane) of the discotic molecules with respect to a layer plane increases or decreases in the depth direction of the optically anisotropic layer, with increase in the distance from the interface with a support (for example, a polymer film) for the layer. The average of the tilt angles preferably increases with increase in the distance. The tilt angles may increase continuously, decrease continuously, increase intermittently, or decrease intermittently in the optically anisotropic layer; and the tilt angles may increase continuously and decrease continuously in the optically anisotropic layer and may increase intermittently and decrease intermittently in the optically anisotropic layer.

The optically anisotropic layer in which the tilt angles increase or decrease intermittently contains a region in which the tilt angles don't vary in midway in the thickness direction. According to the present invention, the anisotropic layer may contain such region in which the tilt angles don't vary, so far as the layer shows an overall increase or decreasing tendency.

It is still more preferable that the tilt angles of discotic molecules continuously increase.

The first and second optically anisotropic layers may be formed typically by applying a composition comprising a liquid crystalline discotic compound to a surface of a support such as a polymer film, and by heating if necessary. In order to align liquid crystalline discotic molecules in the above-described desired alignment state, it is preferable to use an alignment layer, or materials capable of controlling alignment of the liquid crystalline molecules, such as chiral agent, surfactant, polymer and so forth. Use of an alignment layer, for example, makes it possible to align the long axes of discotic molecules in an area close to the interface with the alignment layer, by appropriately selecting a material composing the alignment layer, or by appropriately selecting a condition of rubbing treatment. The directions of long axes (disc plane) of discotic molecules on the top surface side (air side) are adjustable generally by appropriately selecting the species of the discotic compound or additives used in combination therewith. Beside this, the composition used for preparing the optically anisotropic layer can be added also with a polymerizable monomer, a polymerization initiator and so forth contributing to fixing the liquid crystalline discotic molecules.

[Additives of Optically Anisotropic Layer]

Various additives such as a chiral agent may be added to the composition to be used for preparing the first or second optically anisotropic layer. Examples of the additive include plasticizers, surfactants, polymerizable monomers. Such additives may contribute to improving the uniformity of the layer, the strength of the layer, or promoting rod like molecules in the desired alignment. Examples of the surfactant include, but not to be limited to, the fluorine-containing surfactant shown below.

Fluorine-Containing Surfactant

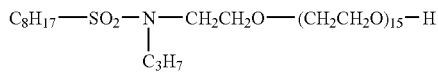

The polymerizable monomer may be selected from radical-polymerizable or cation-polymerizable compounds, and desirably selected from radical-polymerizable compounds having a plural function group, and among them, the compounds which can copolymerize with the polymerizable liquid-crystalline compound described above are preferred. Preferred examples of the polymerizable monomer include those described in the columns of [0018] to [0020] in JPA No. 2002-296423. In usual, the amount of the polymerizable monomer is desirably from 1 to 50 wt %, and more desirably from 5 to 30 wt %, with respect to the total weight of a single or plural liquid-crystalline compounds.

The surfactant may be selected from any known surfactants, and is desirably selected from fluoride-surfactants. More specifically, the compounds, described in the columns of [0028] to [0056] in JPA No. 2001-330725 are preferred.

Single or plural polymers may be used with the liquid crystal. The polymer is desirably selected from polymers which can give the variation to the tilt angles of discotic molecules. Examples of the polymer include cellulose esters. Preferred examples of cellulose ester include those described in the column [0178] in JPA No. 2000-155216. Avoiding inhibiting the alignment of the liquid-crystalline compound, the amount of the polymer is desirably from 0.1 to 10 wt %, and more desirably from 0.1 to 8 wt %, with respect to the weight of the liquid-crystalline compound.

[Preparation of Optically Anisotropic Layer]

The first and second anisotropic layers may be produced by applying a composition such as a coating fluid comprising liquid crystalline compound and, if necessary one or more additives to a surface of an alignment layer.

The composition may be prepared as a coating fluid, and one or more types of solvents may be used for preparing the coating fluid. The solvent is desirably selected from organic solvents. Examples of the organic solvent include amides such as N,N-dimethylformamide, sulfoxides such as dimethyl sulfoxide, heterocyclic compounds such as pyridine, hydrocarbons such as benzene and hexane, alkyl halides such as chloroform and dichloromethane, esters such as methyl acetate and butyl acetate, ketones such as acetone and methyl ethyl ketone and ethers such as tetrahydrofuran and 1,2-dimethoxyethane. Alkyl halides and ketones are preferred. One or more kinds of solvents may be used for preparing the coating solutions.

The coating fluid can be applied by known techniques (e.g., wire-bar coating, extrusion coating, direct gravure coating, reverse gravure coating and die coating) to a surface.

According to the present invention, the optically anisotropic layer desirably has a thickness of 0.1 to 10 micrometers, preferably of 0.5 to 5 micrometers, and more preferably of 1 to 5 micrometers.

[Fixing of Discotic Molecules]

It is preferred that discotic molecules in the optically anisotropic layer are fixed in an alignment state. The discotic molecules are desirably fixed by polymerization reaction. Polymerization reactions include thermal polymerization reactions employing a thermal polymerization initiator and photo-polymerization reactions employing a photo-polymerization initiator. A photo-polymerization reaction is preferred.

Examples of photo-polymerization initiators include alpha-carbonyl compounds (described in U.S. Pat. Nos. 2,367,661 and 2,367,670), acyloin ether (described in U.S. Pat. No. 2,448,828), alpha-hydrocarbon-substituted aromatic acyloin compounds (described in U.S. Pat. No. 2,722,512), polynuclearquinone compounds (described in U.S. Pat. Nos. 3,046,127 and 2,951,758), combinations of triarylimidazole dimers and p-aminophenyl ketones (described in U.S. Pat. No. 3,549,367), acridine and phenadine compounds (described in JPA No. sho 60-105667 and U.S. Pat. No. 4,239,850), and oxadiazole compounds (described in U.S. Pat. No. 4,212,970).

The amount of photo-polymerization initiator employed is desirably from 0.01 to 20 weight percent, preferably from 0.5 to 5 weight percent, of the solid portion of the coating fluid.

Irradiation for polymerization of discotic molecules is desirably carried out with ultraviolet radiation. The irradiation energy is desirably from 20 mJ/cm$^2$ to 50 J/cm$^2$, preferably from 100 to 800 mJ/cm$^2$. Irradiation may be conducted under heated conditions to promote the photo-polymerization reaction.

A protective layer may be formed on the optically anisotropic layer.

[Alignment Layer]

For aligning liquid-crystalline molecules in the optically anisotropic layer, an alignment layer is desirably used. However, according to the present invention, an alignment layer is not an essential element after fixing liquid-crystalline molecules because the molecules fixed in an alignment state once can keep the alignment without an alignment layer. Thus, after an optically anisotropic layer is formed on an alignment layer, only the optically anisotropic layer may be transferred from on the alignment layer to on a support, and in such case, the alignment layer is absent.

The alignment layer that can be employed in the present invention may be provided by rubbing a layer formed of an organic compound (preferably a polymer), oblique vapor deposition, the formation of a layer with microgrooves, or the deposition of organic compounds (for example, omega-tricosanoic acid, dioctadecylmethylammonium chloride, and methyl stearate) by the Langmuir-Blodgett (LB) film method. Further, alignment layers imparted with orientation functions by exposure to an electric or magnetic field or irradiation with light are also known.

The alignment layers formed by rubbing polymer layers are particularly desirable. The polymers used for preparing the alignment layers may basically have a molecular structure capable of aligning liquid-crystalline molecules. According to the present invention, the polymer is desirably selected from polymers having such a molecular structure and further having a structural feature in which a main chain bounds to side chains containing a crosslinkable group (such as a double bonding); or polymers having a structural feature in which a main chain bounds to side chains containing a crosslinkable function group capable of aligning liquid-crystalline molecules.

The polymers may be selected from polymers capable crosslinking themselves or polymers to be crosslinked by any crosslinkable agent, and such polymers may be used in any combination.

Examples of the polymer used for preparing an alignment layer include methacrylate copolymers described in the column [0022] in JPA No. hei 8-338913, styrene copolymers, polyolefins, polyvinyl alcohols, modified polyvinyl alcohols, poly(N-methylol acrylamide), polyesters, polyimides, vinyl acetate copolymers, carboxymethylcelluloses and polycarbonates. Silane coupling agents are also used as a polymer. Water-solbule polymers such as poly(N-methylol acrylamide), carboxymethylcelluloses, gelatins, polyvinyl alcohols or modified polyvinyl alcohols are preferred; gelatins, polyvinyl alcohols and modified polyvinyl alcohols are more preferred; and polyvinyl alcohols and modified polyvinyl alcohols are much more preferred. Using plural polyvinyl alcohols or modified polyvinyl alcohols, they have a different polymerization degree each other, is especially preferred.

Examples of the polymer used for preparing an alignment layer include methacrylate copolymers described in the column [0022] in JPA No. hei 8-338913, styrene copolymers, polyolefins, polyvinyl alcohols, modified polyvinyl alcohols, poly(N-methylol acrylamide), polyesters, polyimides, vinyl acetate copolymers, carboxymethylcelluloses and polycarbonates. Silane coupling agents are also used as a polymer. Water-solbule polymers such as poly(N-methylol acrylamide), carboxymethylcelluloses, gelatins, polyvinyl alcohols or modified polyvinyl alcohols are preferred; gelatins, polyvinyl alcohols and modified polyvinyl alcohols are more preferred; and polyvinyl alcohols and modified polyvinyl alcohols are much more preferred. Using plural polyvinyl alcohols or modified polyvinyl alcohols, they have a different polymerization degree each other, is especially preferred.

The saponification degree of the polyvinyl alcohol is desirably from 70 to 100%, and more desirably from 80 to 100%. The polymerization degree of the polyvinyl alcohol is desirably from 100 to 5000.

In usual, the side chain having a function capable of aligning discotic liquid-crystalline molecules may have a hydrophobic group as a function group. The types of the function group may be decided depending on various factors such as types of the liquid-crystalline compounds or desired alignment state.

For example, the modified group can be introduced into the polyvinyl alcohol by copolymerization modification, chain-transfer modification or bloc-polymerization modification. Examples of the modified group include hydrophilic groups such as a carboxylic acid group, a sulfonic acid group, a phosphoric acid group, an amino group, an ammonium group, an amide group or a thiol group; $C_{10-100}$ hydrocarbon groups; hydrocarbon groups substituted with fluorine atoms; thioether groups, polymerizable groups such as an unsaturated polymerizable group, an epoxy group or an aziridile group; and alkoxysilyl groups such as tri-, di- or mono-alkoxysilyl group. Specific examples of such modified polyvinyl alcohols include those described in the columns [0022] to [0145] in JPA No. 2000-155216 and those described in the columns [0018] to in JPA No. 2002-62426.

It is possible to copolymerize a polymer in an alignment layer and a multi-functional monomer in an optically anisotropic layer, when the polymer in the alignment layer has a main chain bonding to side chains containing a crosslinkable functional group, or the polymer in the alignment layer has side chain being capable of aligning liquid-crystalline molecules and containing a crosslinkable functional group. In such case, not only between the multi-functional monomers but also between the polymers in the alignment layer and the multi-functional monomers and the polymers in the alignment layer, the covalent bondings are formed and the bonding strengths are improved. Thus, in such case, the strength of the optical compensatory film can be remarkably improved.

The polymer in the alignment layer desirably has crosslinkable functional group containing a polymerizable group. Specific examples include those described in the columns of [0080] to [0100] in JPA No. 2000-155216.

The polymer in the alignment layer may be crosslinked by a crosslinkable agent.

Examples of the crosslinkable agent include aldehydes, N-methylol compounds, dioxane derivatives, compounds to act when being activated their carboxyl groups, active vinyl compounds, active halogen compounds, isoxazoles and dialdehyde starches. Single or plural type of crosslinkable agents may be used. Specific examples of the crosslinkable agent include the compounds described in the columns [0023] to [0024] in JPA No. 2002-62426. Aldehydes having a high reaction-activity are preferred, and glutaraldehydes are more preferred.

The amount of the crosslinkable agent is desirable from 0.1 to 20 wt %, and more desirably 0.5 to 15 wt %, with respect to the weight of the polymer. The residual amount of the unreacted crosslinkable-agent in the alignment layer is desirably not greater than 1.0 wt %, and more desirably not greater than 0.5 wt %. When the residual amount falls with in the range, the alignment layer has a sufficient durability, and even if the alignment is used in a liquid-crystal display for a long time, or is left under a high temperature and humidity atmosphere for a long time, no reticulation is appeared in the alignment layer.

The alignment layer may be prepared by applying a coating fluid, containing the above polymer, and, if necessary, the corsslinkable agent, to a surface of a support, drying under heating (crosslinking), and performing a rubbing treatment. The crosslinking reaction may be carried out any time after applying the coating fluid to a surface. When a hydrophilic polymer such as polyvinyl alcohol is used for preparation of an alignment layer, the coating fluid is desirably prepared using a mixed solvent of an organic solvent such as methanol, exhibiting a deforming function, and water. The weight ratio of water to methanol is desirably from 0/100 to 99/1, and more desirably from 0/100 to 91/9. Using such a mixed solvent can prevent bubbles from generating, and can remarkably reduce defects in the surface of the alignment layer and the optically anisotropic layer.

The coating liquid may be applied by any known method such as a spin-coating method, a dip coating method, a curtain coating method, extrusion coating method, rod coating method, or roll coating method. The rod coating method is especially preferred. The thickness of the alignment layer after being dried is desirably from 0.1 to 10 micrometers. Drying may be carried out at 20 to 110° C. In order to form sufficient crosslinking, drying is desirably carried out at 60 to 100° C., and more desirably at 80 to 100° C. The drying may be continued for 1 minute to 36 hours, and desirably for 1 minute to 30 minutes. The pH is desirably set in a proper range for a crosslinkable agent to be used, and when glutaraldehyde is used, the pH is desirably set in a range from 4.5 to 5.5, and more desirably 5.

The alignment layer may be formed on a surface of a support such as a polymer film or a surface of an under coating layer which is optionally formed on a support. The alignment layer can be obtained by applying a rubbing treatment to the surface of the polymer layer after crosslinking the polymer layer.

The rubbing treatment may be carried out according to any known treatment used in a liquid-crystal alignment step of LCD. For example, the rubbing treatment may be carried out by rubbing the surface of a polymer layer with a paper, a gauze, a felt, a rubber, a nylon fiber, polyester fiber or the like in a direction. Usually, the rubbing treatment may be carried out by rubbing a polymer layer with a fabric in which fibers having a uniform length and line thickness are implanted averagely at several times.

Next, the liquid-crystalline molecules are aligned on the alignment layer. After that, if necessary, the reaction between the polymers in the alignment layer and the multi-functional monomers in the optical compensatory film may be carried out, or the crosslinking reaction of the polymers in the alignment layer with a crosslinkabkle agent may be carried out.

The thickness of the alignment layer is desirably from 0.1 to 10 micrometers.

[Hard Coat Film, Anti-Glaring Film and Anti-Reflection Film]

The optical compensation film of the present invention may have other functional layers. Examples of which include anti-glaring hard coat layer, non-anti-glaring hard coat layer, middle-refractive-index layer, high-refractive-index layer and low-refractive-index layer. Addition of these functional layers makes it possible to further improve the visibility of the liquid crystal display device to be adopted. Preferable examples of combination of the functional films include at least any one of anti-glaring hard coat layer, non-anti-glaring hard coat layer, middle-refractive-index layer and high-refractive-index layer, as being combined with a low-refractive-index layer. Preferable embodiments as such anti-glaring film and anti-reflection film are detailed in Journal of Technical Disclosure No. 2001-1745, p. 54 to 57, issued on Mar. 15, 2001 by the Japan Institute of Invention and Innovation, and are preferably applicable to the present invention. The low-refractive-index layer, middle-refractive-index layer and high-refractive-index layer refer to layers having refractive indices of 1.2 to 1.5, 1.55 to 1.8, and 1.6 to 2.4, respectively, and the refractive indices are adjustable within these ranges by appropriately selecting the materials and methods of fabrication. The refractive index of the middle-refractive-index layer is adjusted so as to fall between those of the low-refractive-index layer and the high-refractive-index layer. Preferable examples of these layers are described in Japanese Laid-Open Patent Publication "Tokkaihei" No. 11-153703, and are applicable to the present invention.

[Support]

The optical compensation film of the present invention may have support supporting each of, or both of the first and second optically anisotropic layers. The support is preferably transparent, and, in particular, preferably has a light transmission of not less than 80%. The support is preferably selected from polymer films. Examples of materials for the support, however not limited to them, include cellulose esters such as cellulose mono, di or tri-acylates, norbornene based polymers and polymethacrylates. Commercially available polymers (Arton and Zeonex, both under trade names as norbornene-based polymers) may also be used. As described in the pamphlet of International Publication WO 00/26705, known polymers readily causing birefringence such as polycarbonate and polysulfone may also be used in the optical film of the invention, when the molecules of the polymers are modified to control the occurrence of birefringence.

Among these, cellulose esters are preferred, and cellulose esters of lower fatty acids are more preferred. The term "lower fatty acid" is used for any not higher than $C_6$ fatty acids. Cellulose acetate is especially preferred. And cellulose esters of mixed fatty acids such as cellulose acetate propionate and cellulose acetate butyrate can be also used.

The viscosity average polymerization degree (DP) of the cellulose acylate is preferably 250 or more, more preferably 290 or more. Additionally, the cellulose acylate has a narrow molecular weight distribution (Mw/Mn; Mw means weight average molecular weight while Mn means number average molecular weight) by gel permeation chromatography. Specifically, the value of Mw/Mn is preferably 1.0 to 1.7, more preferably 1.0 to 1.65.

Cellulose acylates having an acylation degree falling within a range from 55.0 to 61.5% are preferred, and those having an acylation degree falling within a range from 57.0 to 62.0% are more preferred. The acylation degree can be calculated and determined by measuring according to ASTM-D817-91 (a test method of cellulose acylate or the like).

All of hydroxyl groups at 2-, 3, and 6-positions in cellulose ester are not substituted equally, and 6-position hydroxyl groups tend to be substituted poorly. Using for preparing the support, cellulose esters almost equally or more substituted at 6-position hydroxyl groups as same as 2- or 3-positions are preferably employed. The ration of substitution degree at the 6-position to the sum substitution degree at 2- and 3-positions is preferably from 30 to 40%, more preferably not less than 31% and much more preferably not less than 32%. The substitution degree at 6-position is preferably 0.88 and more.

Examples of the acylate group and examples of the process for producing such cellulose acylate are described in Materials detailed in the above-described Journal of Technical Disclosure No. 2001-1745, published in Mar. 15, 2001.

In order to adjust retardation of a polymer film within a range required for the support, applying external force to the polymer film such as stretching the polymer film is usually employed. Or compounds capable of increasing retardation, compounds capable of decreasing retardation, or compounds capable of controlling retardation variation depending on wavelength may be added to a polymer film. For adjusting retardation of a cellulose acylate film, aromatic compound having at least two aromatic rings can be employed as an agent capable of increasing retardation. The amount of the aromatic compound is preferable from 0.01 to 20 wt % with respect to a weight of cellulose acylate. Tow or more species of the aromatic compounds may be used. Examples of the aromatic ring include any aromatic hydrocarbon rings and aromatic hetero rings. Examples of the aromatic compound include those described in European Patent No. 0911656A2 and Japanese Laid-Open Patent Publication "Tokkai" Nos. 2000-111914198285 and 2000-275434.

Examples of the compound capable of decreasing retardation and the compound capable of controlling retardation variation depending on wavelength include, but to be limited to, those shown below.

Examples of the Compound Capable of Decreasing Retardation

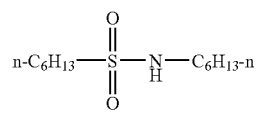
A-1

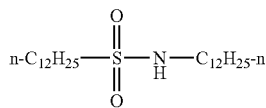
A-2

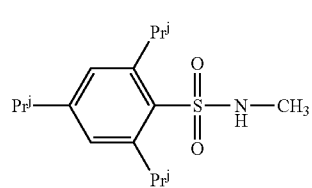
A-3

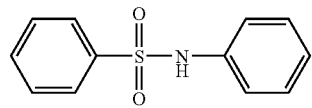
A-4

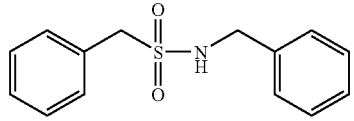
A-5

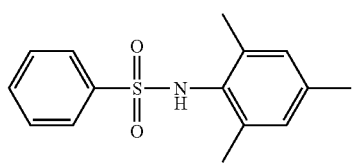
A-6

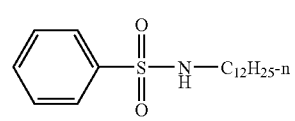
A-7

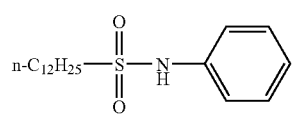
A-8

-continued

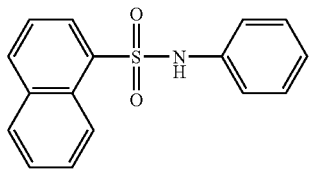
A-9

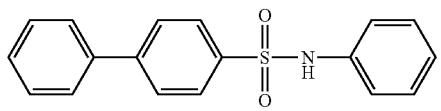
A-10

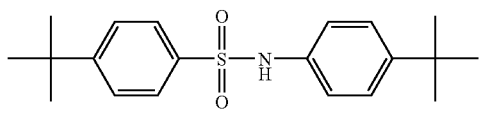
A-11

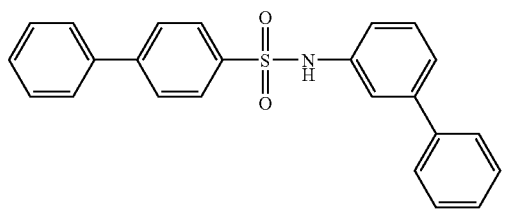
A-12

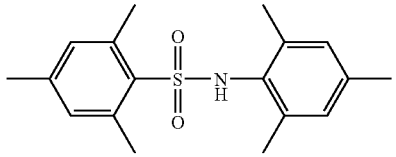
A-13

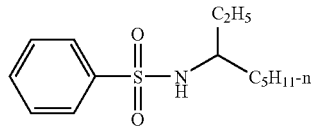
A-14

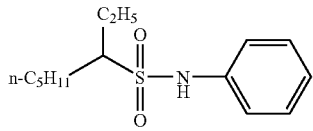
A-15

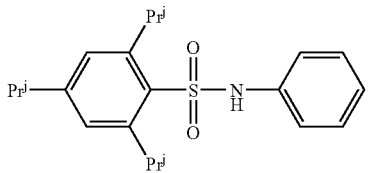
A-16

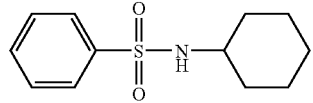
A-17

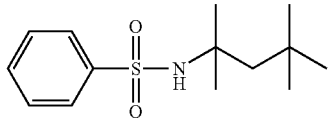
A-18

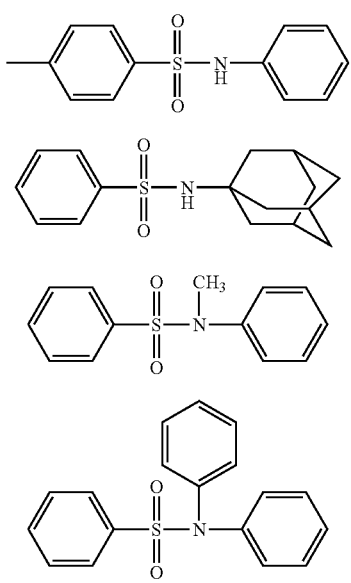

Examples of the Compound Capable of Controlling Retardation Variation Depending on Wavelength

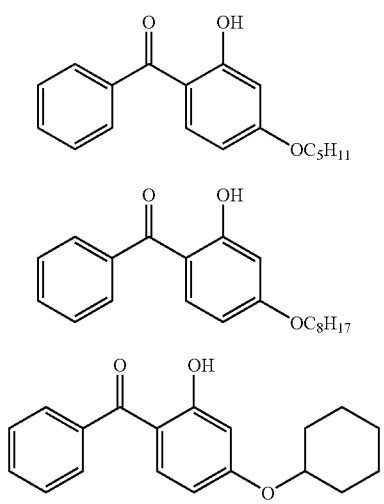

The coefficient of hygroscopic expansion of a cellulose acetate film used as the support is preferably $30 \times 10^{-5}/\% \text{ RH}$ or smaller. The coefficient of hygroscopic expansion is preferably adjusted to $15 \times 10^{-5}/\% \text{ RH}$ or smaller, and more preferably to $10 \times 10^{-5}/\% \text{ RH}$ or smaller. The coefficient of hygroscopic expansion generally falls on a value of $1.0 \times 10^{-5}/\% \text{ RH}$ or larger, although the smaller is the better. The coefficient of hygroscopic expansion expresses the amount of change in sample length under varied relative humidity at a constant temperature.

By adjusting the coefficient of hygroscopic expansion, it is made possible to avoid the frame-like increase in the transmissivity (distortion-induced light leakage), while keeping the optical properties of the optically anisotropic layers and the polarizer film at desirable levels.

A method of measuring the coefficient of hygroscopic expansion will be explained below. A test piece of 5 mm wide and 20 mm long was cut out from the fabricated polymer film, one end of which is fixed, and hung in an atmosphere conditioned at 25° C., 20% RH($R^0$). A 0.5-g weight was hung at the other end, the test piece was allowed to stand for 10 minutes, and the length ($L^0$) was measured. Next, the humidity was raised to 80% RH($R^1$), while keeping the temperature unchanged at 25° C., and the length ($L^1$) was measured. The coefficient of hygroscopic expansion can be calculated from the equation below. Every sample was measured using 10 test pieces thereof, and an average value was adopted.

Coefficient of Hygroscopic Expansion $[/\%RH] = \{(L^1 - L^0)/L^0\}/(R^1 - R^0)$ In view of reducing dimensional changes due to moisture absorption of the polymer film, it is preferable to add a compound having a hydrophobic group, particles or the like. The compound having a hydrophobic group is preferably selected from plasticizers and anti-degradation agents having in the molecule thereof a hydrophobic group such as aliphatic group or aromatic group. Amount of addition of such compound preferably falls in the range from 0.01 to 10% by weight relative to a solution (dope) to be prepared. It is also preferable to reduce the free volume in the polymer film. More specifically, a fewer amount of the residual solvent after formation of the film based on the solvent-casting method descried later will result in a smaller free volume. It is preferable to dry the polymer film so as to adjust the amount of residual solvent relative to the cellulose acetate film within the range from 0.01 to 1.00% by weight.

The polymer film can be added with various additives (for example, UV blocker, releasing agent, antistatic agent, anti-degradation agent (for example, antioxidant, peroxide decomposing agent, radical inhibitor, metal inactivator, acid capturing agent, amine), and infrared absorber), wherein the additives may be in solid form or in oily form. For the case where the film is composed of a plurality of layers, the individual layers may differ from each other in species or amount of addition of the additives. Materials detailed in the above-described Journal of Technical Disclosure No. 2001-1745, p. 16 to 22 are preferably used. The amount of addition of the individual materials is not specifically limited so far as they can exhibit their functions, but preferably falls in the range from 0.001 to 25% by weight of the total composition of the polymer film.

[Method of Producing Polymer Film]

The polymer film is preferably produced by the solvent-casting method. In the solvent-casting method, the film is fabricated using a solution (dope) prepared by dissolving a polymer material into an organic solvent. In the solvent-casting method, the film is formed by casting the dope onto a drum or a band, and then by allowing the solvent to evaporate. The dope before being cast is preferably adjusted in the concentration so as to have a solid content of 18 to 35%. The surface of the drum or the band is preferably mirror-finished.

The dope is preferably cast onto a surface, having a surface temperature of 10° C. or lower, of the drum or the band. After casting, the dope is preferably dried for two seconds or longer under air blow. It is also allowable to peel off the obtained film from the drum or the band, and to further dry under a hot air step-wisely varied in the temperature from 100 to 160° C., to thereby evaporate the residual solvent. Such process is described in Examined Japanese Patent Publication "Tokko-hei" No. 5-17844. This method is successful in shortening the time from casting up to peeling off. This process needs that the dope can gelate at the surface temperature of the drum or the band during casting.

In the casting process, a single species of cellulose acylate solution may be cast to thereby form a single layer, or two or more species of cellulose acylate solution may be cast in a concomitant or sequential manner.

Examples of such method of co-casting a plurality of cellulose acylate solutions to thereby form two or more layers include a method of respectively casting solutions containing cellulose acylate through a plurality of casting ports disposed as being spaced from each other in the direction of travel of the support (for example, the method described in Japanese Laid-Open Patent Publication "Tokkaihei" No. 11-198285); a method of casting cellulose acylate solution through two casting ports (the method disclosed in Japanese Laid-Open Patent Publication "Tokkaihei" No. 6-134933); a method of concomitantly extruding a high-viscosity and a low-viscosity cellulose acylate solutions, while enveloping flow of the high-viscosity cellulose acylate solution with the low-viscosity cellulose acylate solution (the method disclosed in Japanese Laid-Open Patent Publication "Tokkaisho" No. 56-162617). The present invention by no means limited by these methods.

Process steps of fabrication based on these solvent-casting methods are detailed on pages 22 to 30 of the above-described Journal of Technical Disclosure No. 2001-1745, and are classified into dissolution, casting (including co-casting), metal support, drying, separation, stretching and so forth.

The thickness of a film used as the support is preferably 15 to 120 µM, and more preferably 30 to 80 µm.

[Surface Treatment of Polymer Film]

The polymer film is preferably subjected to surface treatment. The surface treatment includes corona discharge treatment, glow discharge treatment, flame treatment, acid treatment, alkali saponification treatment and UV irradiation treatment. These treatments are detailed on pages 30 to 32 of the above described Journal of Technical Disclosure No. 2001-1745. Among these, particularly preferable is the alkali saponification treatment, which is extremely effective as the surface treatment for the cellulose acylate film.

The alkali saponification treatment may be effected by dipping the film in a saponification solution or coating the saponification solution, wherein the coating method is more preferable. The coating methods include dip coating, curtain coating, extrusion coating, bar coating, and E-type coating method. The alkali saponification solution is exemplified by a potassium hydroxide solution and sodium hydroxide solution, wherein the normality of hydroxyl ion preferably falls within the range from 0.1 to 3.0 N. The alkali saponification solution can be improved in the wettability to the transparent support and in the time-dependent stability, by being added with a solvent having a good wettability to the film (for example, isopropyl alcohol, n-butanol, methanol and ethanol), surfactant, or moistener (for example, diols and glycerin). Specific description is given for example in Japanese Laid-Open Patent Publication "Tokkai" No. 2002-82226 and International Patent Publication No. WO02/46809.

It is also allowable to adopt the single layer method in which only a single layer of under coat layer (as described in Japanese Laid-Open Patent Publication "Tokkaihei" No. 7-333433) or resin layer, such as gelatin layer containing both of a hydrophobic group and a hydrophilic group, is formed by coating in place of, or in addition to the surface treatment; or so-called layering method (as described, for example, in Japanese Laid-Open Patent Publication "Tokkaihei" No. 11-248940), in which a layer having a good adhesiveness to the polymer film is provided as a first layer (referred to as "first undercoat layer", hereinafter), and thereon a hydrophilic resin layer, such as gelatin layer, having a good adhesiveness to the alignment layer is coated as a second layer (referred to as "second undercoat layer", hereinafter).

EXAMPLES

The paragraphs below will further detail the present invention referring to Examples. It is to be understood that materials, reagents, amount and ratio of use, operations and so forth shown in the Examples below may properly be modified without departing from the spirit of the present invention. The present invention is therefore not limited to the specific examples described below.

<Production of Cellulose Acetate Film>

The composition below was poured in a mixing tank, stirred under heating so as to dissolve the individual components, to thereby prepare a cellulose acetate solution.

Formulation of Cellulose Acetate Solution

| | |
|---|---|
| cellulose acetate having an acetylation degree of 60.7 to 61.1% | 100 parts by weight |
| triphenyl phosphate (plasticizer) | 7.8 parts by weight |
| biphenyl diphenyl phosphate (plasticizer) | 3.9 parts by weight |
| methylene chloride (first solvent) | 336 parts by weight |
| methanol (second solvent) | 29 parts by weight |
| 1-butanol (third solvent) | 11 parts by weight |

In another mixing tank, 16 parts by weight of the retardation increasing agent shown below, 92 parts by weight of methylene chloride and 8 parts by weight of methanol are placed, stirred under heating, to thereby prepare a retardation increasing agent solution. The cellulose acetate solution in an amount of 474 parts by weight was mixed with 25 parts by weight of the retardation increasing agent solution, and thoroughly mixed to thereby prepare a dope. The amount of addition of the retardation increasing agent was 6.0 parts by weight for 100 parts by weight of cellulose acetate.

Retardation Increasing Agent

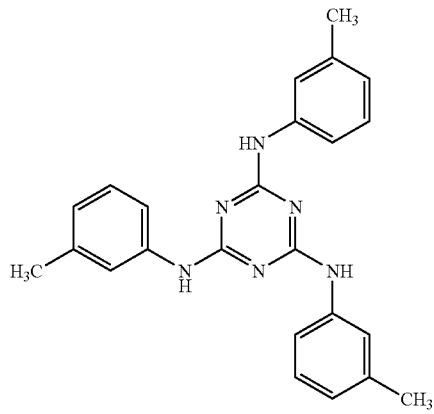

Thus obtained dope was cast using a band stretching machine. After a film temperature on the band of 40° C. was reached, the film was dried with a 70° C. air for one minute, peeled off from the band, further dried with a 140° C. dry air for 10 minutes, to thereby form a cellulose acetate film (80 µm thick) having a residual solvent content of 0.3% by weight.

Thus-produced cellulose acetate film (to be used as a transparent support and a transparent protective film) was then subjected to measurement of Re retardation value and Rth retardation value at a wavelength of 633 nm, using an automatic birefringence meter (KOBRA 21ADH, product of Oji Scientific Instruments). Re was found to be 8 nm, and Rth was 78 nm. The obtained cellulose acetate film was then dipped in a 2.0 N potassium hydroxide solution (25° C.) for 2 minutes, neutralized with sulfuric acid, washed with pure water, and then dried. A cellulose acetate film to be used as a transparent protective film was thus fabricated.

<Preparation of Alignment Layer>

To a surface of the cellulose acetate film, a coating liquid having the formulation below was applied using a #16 wire bar coater in an amount of 28 μL/m². The obtained layer was dried with a 60° C. air for 60 seconds, and was further dried with a 90° C. air for 150 seconds. The surface of the obtained layer was then rubbed in the direction in parallel with the in-plane slow axis (parallel to the direction of casting) of the cellulose acetate film (that is, the axis of rubbing was parallel to the slow axis of the cellulose acetate film).

Formulation of Coating Liquid for Alignment Layer

| | |
|---|---|
| modified polyvinyl alcohol shown below | 20 parts by weight |
| water | 360 parts by weight |
| methanol | 120 parts by weight |
| gultaraldehyde (crosslinking agent) | 1.0 part by weight |

Modified Polyvinyl Alcohol

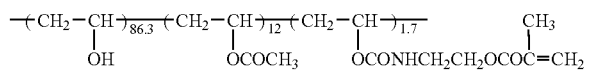

To a surface of the alignment layer, a coating liquid prepared by dissolving 91.0 g of discotic (liquid crystalline) compound (A) shown below, 9.0 g of ethylene-oxide-modified trimethylolpropane triacrylate (V#360, product of Osaka Organic Chemical Industry, Ltd.), 2.0 g of cellulose acetate butylate (CAB551-0.2, product of Eastman Chemical Company), 0.5 g of cellulose acetate butylate (CAB531-1, product of Eastman Chemical Company), 3.0 g of photo-polymerization initiator (Irgacure 907, product of Ciba-Geigy), 1.0 g of sensitizer (Kayacure DETX, product of Nippon Kayaku Co., Ltd.), and 1.3 g of fluoroaliphatic group-containing copolymer (Megafac F780, product of Dainippon Ink and Chemicals, Inc.) in 207 g of methyl ethyl ketone was applied using a #3.6 wire bar in an amount of 6.2 ml/m². The obtained layer was heated in a 130° C. thermostat zone for 2 minutes, so as to align the discotic molecules. Next, the layer was irradiated by UV radiation in a 60° C. atmosphere for one minute using a 120 W/cm high pressure mercury lamp, so as to polymerize the discotic molecules. The optically anisotropic layer was thus formed, and Optical compensation film No. 1 was thus obtained.

Liquid Crystalline Discotic Compound (A)

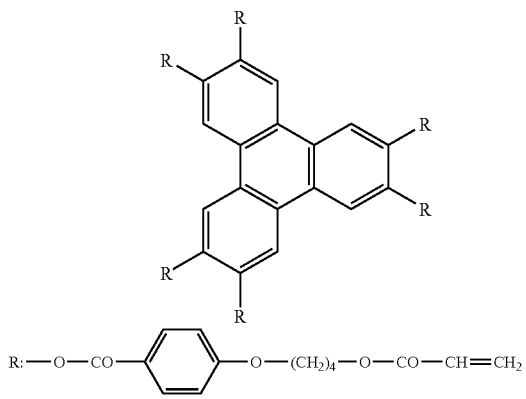

It was found that, in the optically anisotropic layer, the discotic molecules were aligned in a hybrid alignment state so that the angles between the disc planes thereof and a surface of the cellulose acetate film (tilt angle) increased along a direction going from a surface of the cellulose acetate film towards the air interface of the layer, and gave a mean tilt angle of 37°. The optically anisotropic layer was found to be uniform without any defects such as shlieren defects. The thickness of the optically anisotropic layer was found to be 1.7 μm. The tilt angles were calculated by a technique described in "Designing Concepts of the Discotic Negative Birefringence Compensation Films SID98 DIGEST", based on retardation measured using an automatic birefringence meter (KOBRA 21ADH, product of Oji Scientific Instruments) under varied angle of observation, and assuming as an indicatrix model.

Optical Compensation Film No. 1 was observed while disposing the polarizer plates according to the crossed-Nicol arrangement, and non-uniformity was not observed in the normal direction and even in oblique directions rotated up to 60° away from the normal line.

Figure 2:
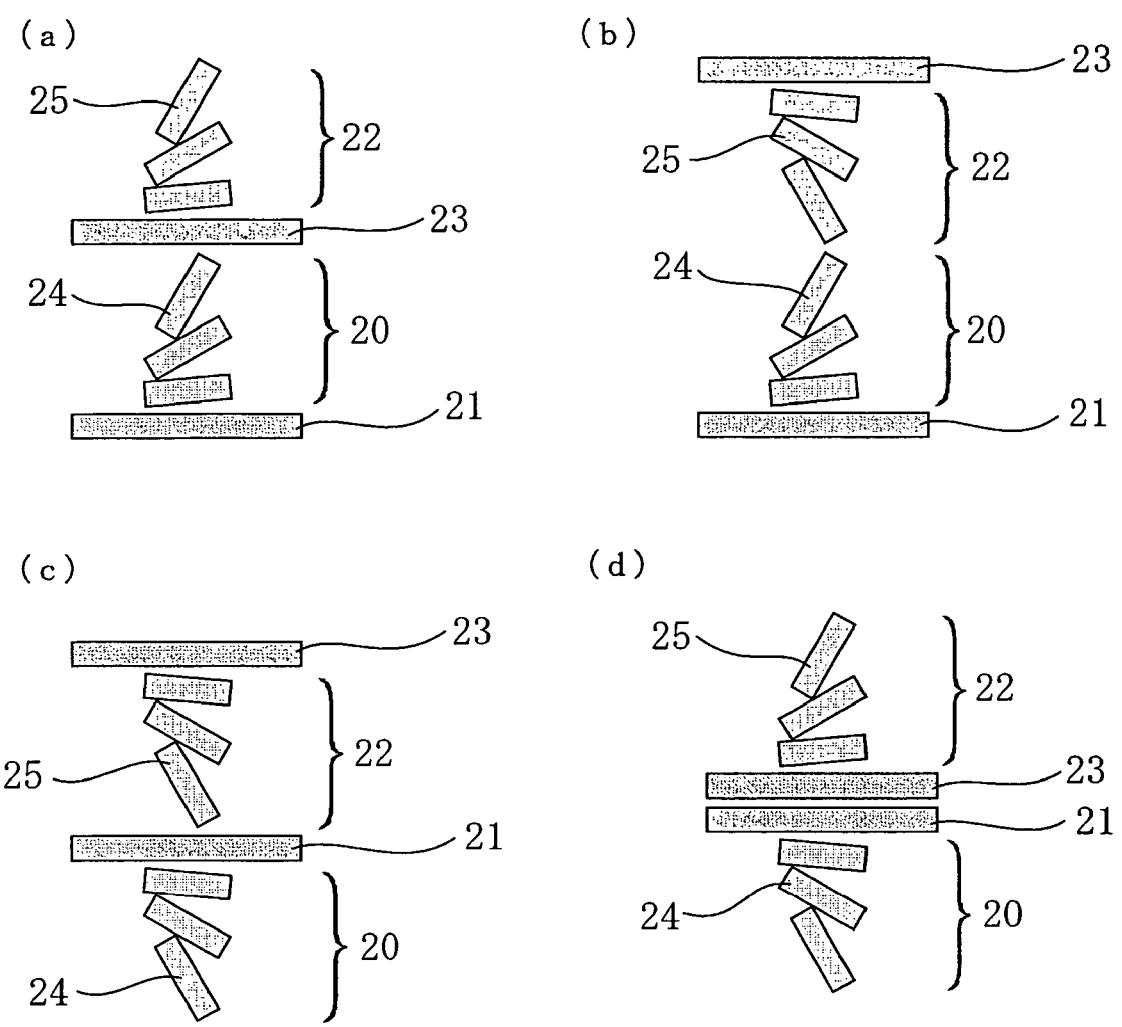
FIGS. 2(a) to 2(d) are conceptual drawings of embodiments of the optical compensation film of the present invention.

Two sheets of Optical Compensation Film No. 1 were bonded using an adhesive in the manner that back surfaces (the surfaces having no optically anisotropic layer formed thereon) of the both were faced each other, to thereby produce Optical Compensation Film No. 2 having a structure as shown FIG. 2 (d). Optical Compensation Film No. 2 represents an embodiment of the present invention.

(Production of Polarizer)

PVA having a mean degree of polymerization of 4000 and a degree of saponification of 99.8 mol % was dissolved into water, to thereby obtain a 4.0% aqueous solution. The solution was then cast on a band using a tapered die and dried, so as to have the pre-stretching thickness of 110 mm, a thickness on the left edge of 120 μm, and a thickness on the right edge of 135 μm.

The film was then peeled off from the band, obliquely stretched in a dry state in a 45° direction, and directly immersed in an aqueous solution containing 0.5 g/L of iodine and 50 g/L of potassium iodide at 30° C. for one minute, then in an aqueous solution containing 100 g/L of boric acid and 60 g/L potassium iodide at 70° C. for 5 minutes, washed in a water bash for 10 minutes, and then dried at 80° C. for 5 minutes, to thereby obtain an iodine-base polarizer. The polarizer was found to be 1340 mm wide, and 20 μm thick on both of right and left edges.

The stretched polyvinyl alcohol film was allowed to absorb iodine to thereby give the polarizer film, and the separately fabricated optical compensation film 1 was bonded to one surface of the polarizer film while facing the support surface therewith, using a polyvinyl alcohol-base adhesive. A 80-μm-thick cellulose triacetate film (TD-80U, product of Fuji Photo Film Co., Ltd.) was saponified, and the product was bonded to the opposite surface of the polarizer film, using a polyvinyl alcohol-base adhesive. The polarizer film and Optical Compensation Film No. 1 were disposed so that the absorption axis of the former was perpendicular to the slow axis of the latter (in parallel with the direction of casting). A polarizer plate having the optically anisotropic layer formed thereon was thus produced.

(Evaluation in TN Liquid Crystal Cell)

Various types of liquid crystal display devices for displaying three-dimensional image were produced based on configurations similarly to that shown in FIG. 1, and slightly modified as listed in Table 1. The polarizer plates each having the optically anisotropic layer formed thereon was used as the polarizer film 11 and the optically anisotropic layer 12, and as the polarizer film 17 and the optically anisotropic layer 16. The liquid crystal cells 13 and 15 used herein were 19-inch or 17-inch liquid crystal cells used for commercial liquid crystal display devices (MD191S or RDT-1710V, products of Mitsubishi Electric Corporation). When compared between the 19-inch liquid crystal cell and the 17-inch liquid crystal cell, the 17-inch cell is known to have a higher on-axis contrast ratio, and the both are differed in the pixel pitch. Retardation and direction of twisting of the liquid crystal layers were measured using a general-purpose polarization analyzer H33, a product of Shintec, Co., Ltd. It was confirmed that the retardation was 0.4 μm or around, and the liquid crystal cell was twisted from the light source side towards the display observation side by approximately 90°, clock-wisely as viewed from the viewer. The optical compensation layer 14 disposed herein was Optical Compensation Film No. 2 produced in the above. The back light used herein was the one mounted on MD191S. The emission angle of this back light was found to be 30° (the emission angle was defined as a range ensuring 50% or more luminance relative to 100% on-axis luminance). The depolarizer plate 18 was not disposed.

Visibility of three-dimensional images presented on thus-produced liquid crystal display devices were evaluated. Results are shown in Table 1. Symbols given in the column for three-dimensional visibility express grade of the three-dimensional visibility, representing superiority in the order of x→Δ→○⊙. The symbol "○" given in the other columns means that the member was disposed in the liquid crystal display device.

It was found from the results listed in Table 1 that the configurations of the liquid crystal display devices (1) to (6) successfully provided desirable three-dimensional images, wherein further desirable three-dimensional images were shown by the liquid crystal display devices (1) to (4). Liquid crystal display devices (7) and (8) are conventional two-dimensional display devices, and corresponds to Comparative Examples.

What is claimed is:

1. An optical compensation film to be used in a liquid crystal display device capable of displaying three-dimensional images, comprising:
  a first optically anisotropic layer and a second optically anisotropic layer, each of which formed of a composition comprising a discotic liquid-crystalline compound, wherein molecules of the discotic liquid-crystalline compound in each of the first and second optically anisotropic layers are fixed in a hybrid alignment state in which tilt angles of the molecules with respect to a layer plane varies in a thickness direction.

2. The optical compensation film of claim 1, wherein, in the first optically anisotropic layer, the tilt angles of molecules in an area closer to the second optically anisotropic layer are larger than those in an area farther from the second optically anisotropic layer; and, in the second optically anisotropic layer, the tilt angles of molecules in an area farther from the first optically anisotropic layer are larger than those in an area closer to the first optically anisotropic layer.

3. The optical compensation film of claim 1, wherein, in the first optically anisotropic layer, the tilt angles of molecules in an area closer to the second optically anisotropic layer are larger than those in an area farther from the second optically anisotropic layer; and, in the second optically anisotropic layer, the tilt angles of molecules in an area closer to the first optically anisotropic layer are larger than those in an area farther from the first optically anisotropic layer.

4. The optical compensation film of claim 1, wherein, in the first optically anisotropic layer, the tilt angles of molecules in an area farther from the second optically anisotropic layer are larger than those in an area closer to the second optically anisotropic layer; and, in the second optically anisotropic layer, the tilt angles of molecules in an area closer to the first optically anisotropic layer are larger than those in an area farther from the first optically an isotropic layer.

5. The optical compensation film of claim 1, wherein, in the first optically anisotropic layer, the tilt angles of molecules in an area farther from the second optically anisotropic layer are larger than those in an area closer to the second optically anisotropic layer; and, in the second optically anisotropic layer, the tilt angles of molecules in an area farther from the

| Liquid crystal display device | Optically anisotropic layer 12 | Liquid crystal cell 13 | Optical compensation layer 14 | Liquid crystal cell 15 | Optically anisotropic layer 16 | Three-dimensional visibility |
|---|---|---|---|---|---|---|
| (1) | ○ | 19-inch | ○ | 17-inch | ○ | ⊙ |
| (2) | ○ | 19-inch | ○ | 19-inch | ○ | ○ |
| (3) | ○ | 17-inch | ○ | 17-inch | ○ | ○ |
| (4) | none | 19-inch | ○ | 17-inch | ○ | ○ |
| (5) | none | 19-inch | ○ | 17-inch | ○ | Δ |
| (6) | none | 19-inch | ○ | 19-inch | ○ | Δ |
| (7) | none | 19-inch | None | 17-inch | ○ | X |
| (8) | none | none | ○ | 19-inch | ○ | X | first optically anisotropic layer are larger than those in an area closer to the first optically anisotropic layer.

6. The optical compensation film of claim 1, wherein an in-plane slow axis of the first optically anisotropic layer measured in a normal direction to a layer plane is substantially parallel to an in-plane slow axis of the second optically anisotropic layer measured in a normal direction to a layer plane.

7. The optical compensation film of claim 1, wherein an in-plane slow axis of the first optically anisotropic layer measured in a normal direction to a layer plane is not parallel to an in-plane slow axis of the second optically anisotropic layer measured in a normal direction to a layer plane.

8. The optical compensation film of claim 1, further comprising at least one support.

9. The optical compensation film of claim 8, further comprising, on the support,
   at least any one of an anti-glaring hard coat layer, a non-anti-glaring hard coat layer, a middle-refractive-index layer and a high-refractive-index layer, and
   a low-refractive-index layer.

10. A liquid crystal display device comprising in the order below,
    a light source,
    a polarizer film,
    a first liquid crystal cell comprising a pair of substrates, one of which having an electrode on one surface, and a liquid crystal layer held between said substrates, containing a liquid crystal material;
    a first optical compensation layer comprising at least a single layer; and
    a second liquid crystal cell comprising a pair of substrates, one of which having an electrode on one surface, and a liquid crystal layer held between said substrates, containing a liquid crystal material;
    wherein the first optical compensation layer comprises a first optically anisotropic layer and a second optically anisotropic layer, each of which formed of a composition comprising a discotic liquid-crystalline compound, wherein molecules of the discotic liquid-crystalline compound in each of the first and second optically anisotropic layers are fixed in a hybrid alignment state in which tilt angles of the molecules with respect to a layer plane vary in a thickness direction.

11. The liquid crystal display device of claim 10, wherein a contrast ratio of the second liquid crystal cell is smaller than a contrast ratio of the first liquid crystal cell.

12. The liquid crystal display device of claim 10, wherein pixel pitch of the second liquid crystal cell is different from pixel pitch of the first liquid crystal cell.

13. The liquid crystal display device of claim 10, wherein the light source is capable of emitting light with an emission angle of 15° or larger.

14. The liquid crystal display device of claim 10, further comprising a second optical compensation layer composed of at least a single layer, being disposed between the first liquid crystal cell and the polarizer film, and/or outside the second liquid crystal cell, the first optical compensation layer and the second optical compensation layer being differed from each other at least either in in-plane retardation (Re) and in-thickness-direction retardation (Rth).

15. The liquid crystal display device of claim 10, comprising an optical compensation film as set forth in claim 1 as the first optical compensation layer.

16. A liquid crystal display device comprising:
    two liquid crystal cells each of which comprises a pair of substrates, one of which having an electrode on one surface, and a liquid crystal layer held between said substrates, containing a liquid crystal material; and
    an optical compensation film comprising a first optically anisotropic layer and a second optically anisotropic layer, each of which formed of a composition comprising a discotic liquid-crystalline compound, wherein molecules of the discotic liquid-crystalline compound in each of the first and second optically anisotropic layers are fixed in a hybrid alignment state in which tilt angles of the molecules with respect to a layer plane varies in a thickness direction.

* * * * *